(12) United States Patent
Walker

(10) Patent No.: US 11,008,035 B1
(45) Date of Patent: May 18, 2021

(54) ALL-TERRAIN ACCESSORIZED STROLLER APPARATUS

(71) Applicant: Lynnette Walker, Buffalo, NY (US)

(72) Inventor: Lynnette Walker, Buffalo, NY (US)

(*) Notice: Subject to any disclaimer, the term of this patent is extended or adjusted under 35 U.S.C. 154(b) by 27 days.

(21) Appl. No.: 16/669,625

(22) Filed: Oct. 31, 2019

(51) Int. Cl.
| | |
|---|---|
| *B62B 9/00* | (2006.01) |
| *B62B 19/02* | (2006.01) |
| *B62B 7/00* | (2006.01) |
| *B62B 7/04* | (2006.01) |
| *B62B 9/26* | (2006.01) |
| *B62B 9/14* | (2006.01) |
| *B62B 9/20* | (2006.01) |
| *B62B 9/08* | (2006.01) |
| *B62B 13/18* | (2006.01) |

(52) U.S. Cl.
CPC .............. *B62B 19/02* (2013.01); *B62B 7/006* (2013.01); *B62B 7/04* (2013.01); *B62B 9/00* (2013.01); *B62B 9/08* (2013.01); *B62B 9/142* (2013.01); *B62B 9/147* (2013.01); *B62B 9/20* (2013.01); *B62B 9/206* (2013.01); *B62B 9/26* (2013.01); *B62B 13/18* (2013.01); *B62B 2202/401* (2013.01)

(58) Field of Classification Search
CPC .. B62B 19/02; B62B 9/00; B62B 9/26; B62B 9/206; B62B 7/006; B62B 2202/401
See application file for complete search history.

(56) References Cited

U.S. PATENT DOCUMENTS

| | | | | |
|---|---|---|---|---|
| 552,112 | A * | 12/1895 | Frye | B62B 19/02 280/13 |
| 967,405 | A * | 8/1910 | Martin | B62B 19/02 280/10 |
| 1,053,616 | A * | 2/1913 | Longenecker | B62B 19/02 280/13 |
| 1,068,120 | A * | 7/1913 | Fransson | B62B 19/02 280/13 |
| 1,657,534 | A * | 1/1928 | Gingold | B62B 19/02 280/13 |
| 2,352,966 | A * | 7/1944 | Morando | B62B 19/02 280/8 |
| 4,479,657 | A * | 10/1984 | Reynolds | B62B 13/18 188/32 |
| 4,570,894 | A * | 2/1986 | Miele | A45B 11/00 224/274 |
| 4,856,809 | A * | 8/1989 | Kohus | B62B 7/083 280/644 |
| 5,407,217 | A * | 4/1995 | Lambert | B62B 19/02 280/10 |
| 5,413,361 | A * | 5/1995 | Mosher | B62B 19/02 280/13 |
| 5,427,390 | A * | 6/1995 | Duncan | B62B 19/02 280/13 |

(Continued)

*Primary Examiner* — Emma K Frick

(57) ABSTRACT

An all-terrain accessorized stroller apparatus for all season and weather capable stroller includes a set of wheels and a pair of handles coupled to a stroller frame. A console that has a pair of handle clamps and a console body is coupled to the pair of handles. A pair of skis is selectively engageable with the set of wheels. A ski rack and a pair of seat supports are coupled to the stroller frame. A child seat that can be in a forward or alternative backward position is selectively engaged with the pair of seat supports. A canopy and a tray are coupled to the child seat.

16 Claims, 7 Drawing Sheets

(56) References Cited

U.S. PATENT DOCUMENTS

| | | | |
|---|---|---|---|
| 6,508,605 B1 | 1/2003 | Cheng | |
| 6,554,294 B2* | 4/2003 | Laudon | B62J 11/00 |
| | | | 280/12.14 |
| 6,708,989 B1* | 3/2004 | Braun | A63C 5/085 |
| | | | 280/13 |
| 6,932,377 B2* | 8/2005 | Bretschger | B62B 9/00 |
| | | | 224/409 |
| 7,753,398 B2 | 7/2010 | Yang | |
| 7,766,367 B2* | 8/2010 | Dotsey | B62B 9/082 |
| | | | 280/647 |
| 8,070,180 B2* | 12/2011 | Stiba | B62B 3/027 |
| | | | 280/648 |
| 8,256,156 B1* | 9/2012 | Burgoyne, Jr. | A01K 97/06 |
| | | | 43/54.1 |
| 8,276,920 B2* | 10/2012 | Clapp | B62B 19/02 |
| | | | 280/7.12 |
| 8,328,226 B2 | 12/2012 | Xu-Hui | |
| 8,439,055 B2* | 5/2013 | April | A45B 11/00 |
| | | | 135/16 |
| 8,596,669 B2* | 12/2013 | Liao | B62B 7/062 |
| | | | 280/647 |
| 8,727,191 B2* | 5/2014 | Winterhalter | B62B 9/26 |
| | | | 224/409 |
| 9,010,769 B1* | 4/2015 | Munive | B62B 9/00 |
| | | | 280/33.992 |
| 9,085,312 B2* | 7/2015 | Liu | B62B 7/145 |
| 9,108,659 B2* | 8/2015 | Sparling | B62B 7/142 |
| 9,302,695 B2* | 4/2016 | Hartenstine | B62B 9/00 |
| 9,738,300 B2* | 8/2017 | Georgiev | B62B 9/00 |
| 9,950,732 B1* | 4/2018 | Patterson | B62B 19/02 |
| 10,023,220 B1* | 7/2018 | Samuelian | B62B 19/02 |
| 10,442,453 B2* | 10/2019 | Haut | B62B 7/008 |
| 10,588,425 B1* | 3/2020 | Jordan | A47D 13/06 |
| 2002/0167140 A1* | 11/2002 | Pike | B62B 9/20 |
| | | | 280/47.38 |
| 2003/0025300 A1 | 2/2003 | Maxisch | |
| 2003/0132612 A1* | 7/2003 | Pike | B62B 9/20 |
| | | | 280/642 |
| 2003/0218306 A1* | 11/2003 | Dixon | B62B 9/26 |
| | | | 280/47.38 |
| 2005/0046134 A1* | 3/2005 | Gracias | B62B 7/14 |
| | | | 280/47.38 |
| 2009/0033118 A1* | 2/2009 | Gomez | B62B 9/26 |
| | | | 296/37.4 |
| 2010/0314855 A1* | 12/2010 | Mival | B62B 7/08 |
| | | | 280/650 |
| 2012/0048316 A1* | 3/2012 | Fournillier | A45B 17/00 |
| | | | 135/16 |
| 2015/0251681 A1* | 9/2015 | Castillo | B62B 9/26 |
| | | | 108/27 |

* cited by examiner

ALL-TERRAIN ACCESSORIZED STROLLER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to strollers and more particularly pertains to a new stroller for all season and weather capable stroller.

BRIEF SUMMARY OF THE INVENTION

An embodiment of the disclosure meets the needs presented above by generally comprising a set of wheels and a pair of handles coupled to a stroller frame. A console has a pair of handle clamps and a console body. The pair of handle clamps is selectively engageable with the pair of handles. The console body has at least one cup holder depression. A pair of skis has a plurality of wheel clamps. The plurality of wheel clamps is selectively engageable with the set of wheels. A ski rack is coupled to the stroller frame to selectively receive the pair of skis while not engaged with the set of wheels. A pair of seat supports is coupled to the stroller frame. Each of the pair of seat supports has an engagement channel. A child seat is coupled to the pair of seat supports. The child seat has a pair of connectors each having an engagement tongue that is slidably engageable with the engagement channel. The child seat is engageable with the pair of seat supports in a forward position or in an alternative backwards position. A canopy is coupled to the child seat and has a collapsed position and an alternative covered position. A tray is coupled to the child seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
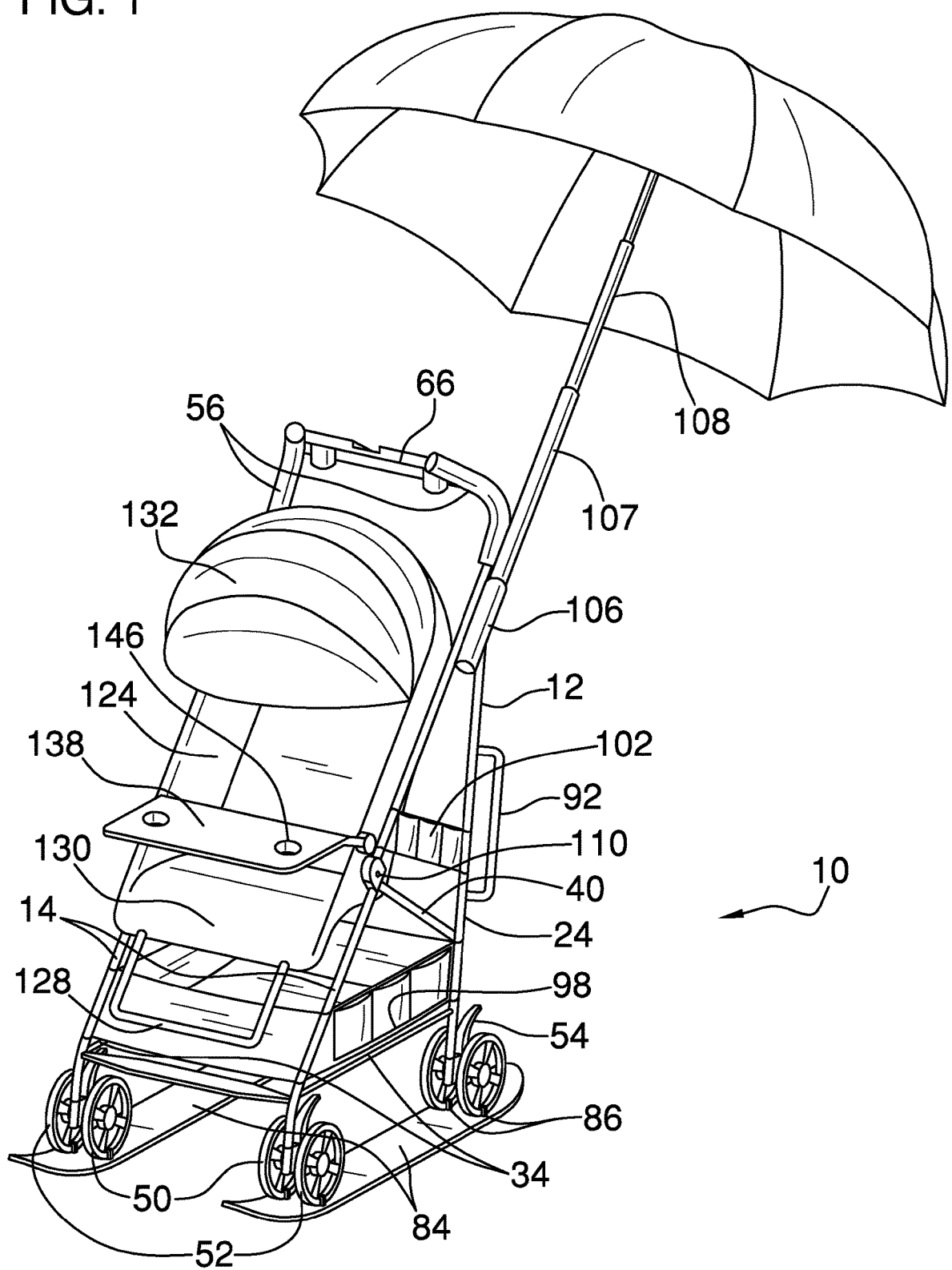
FIG. 1 is an isometric view of an all-terrain accessorized stroller apparatus according to an embodiment of the disclosure.
Figure 2:
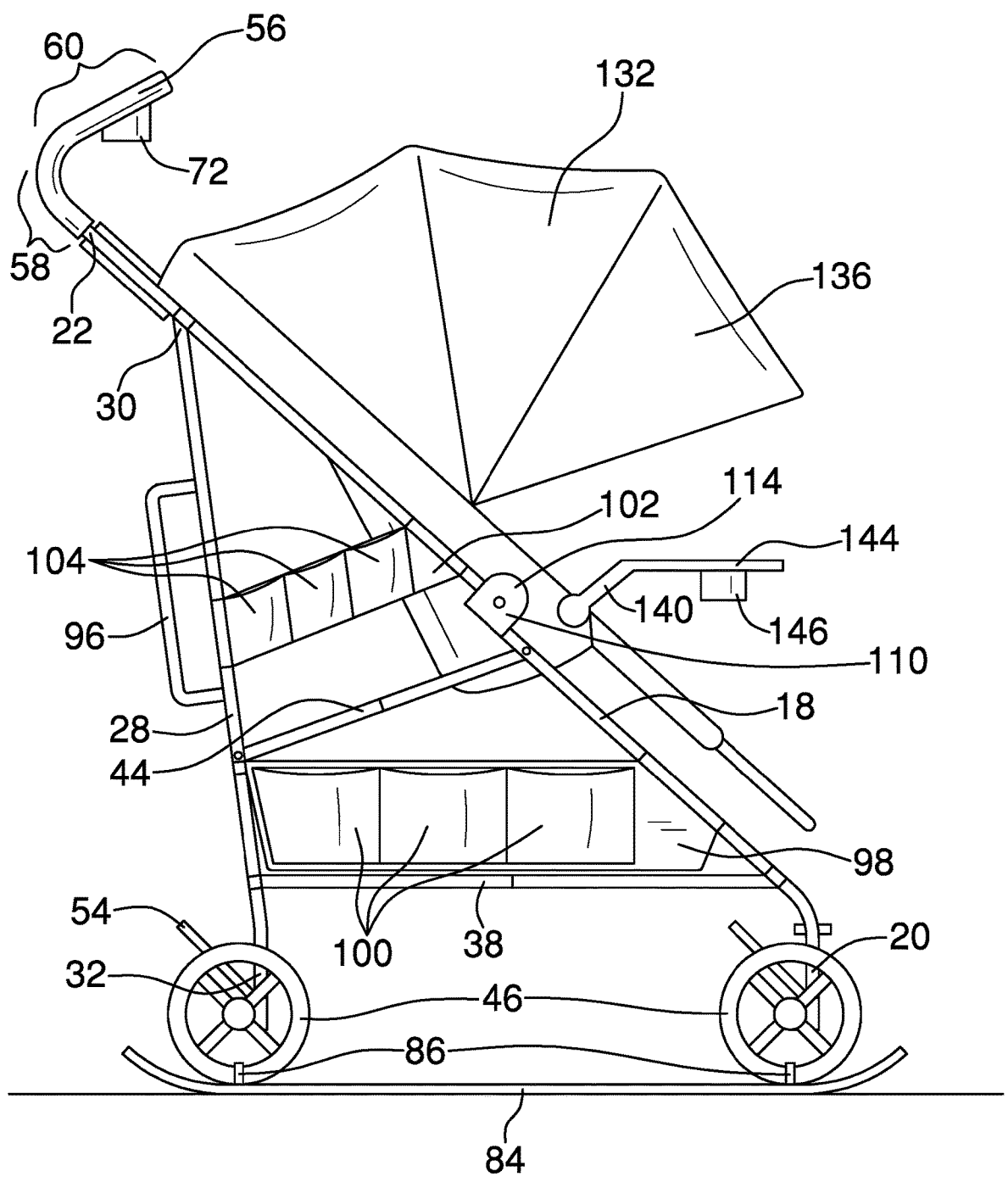
FIG. 2 is a side elevation view of an embodiment of the disclosure.
Figure 3:
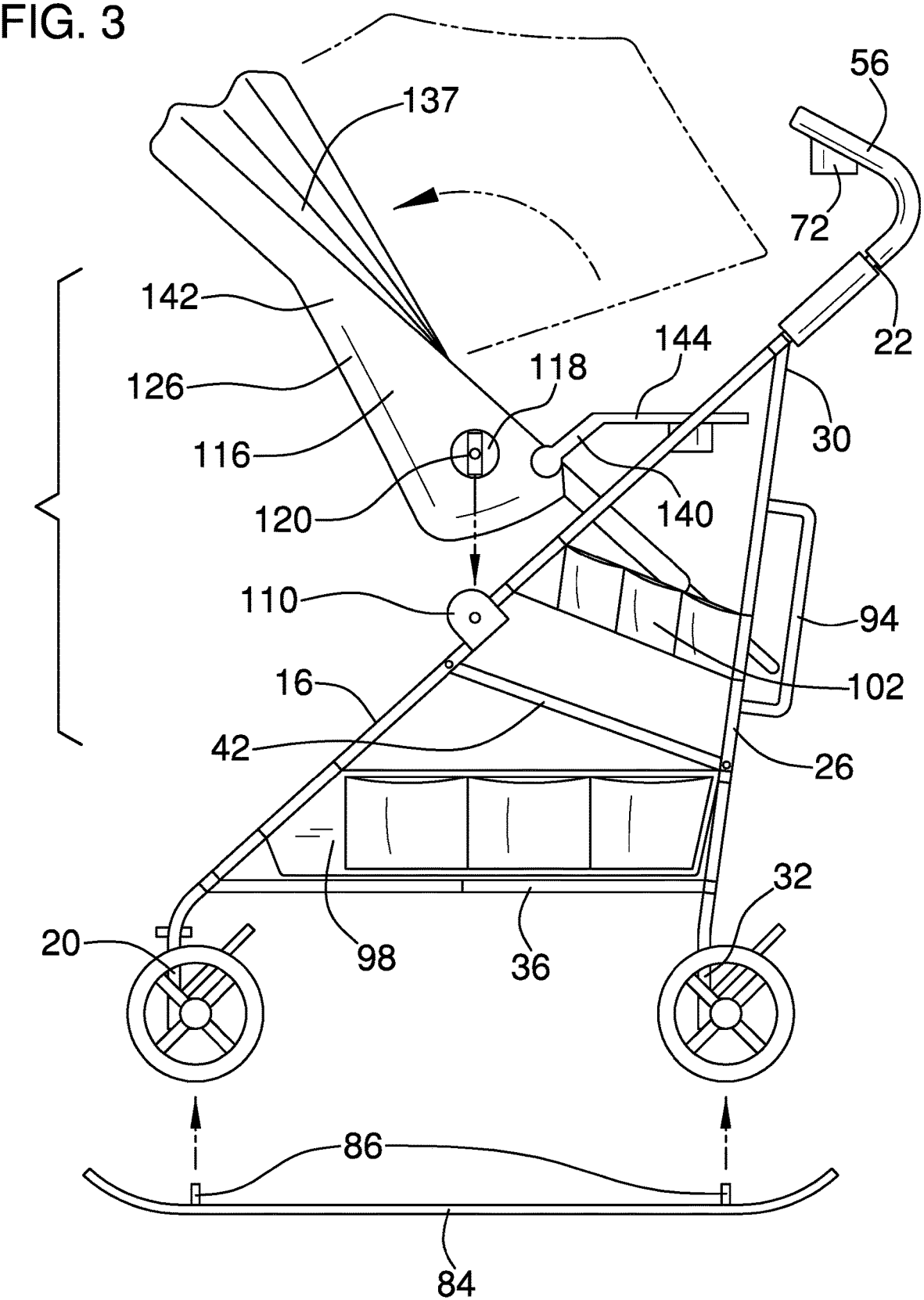
FIG. 3 is a side elevation view of an embodiment of the disclosure.
Figure 4:
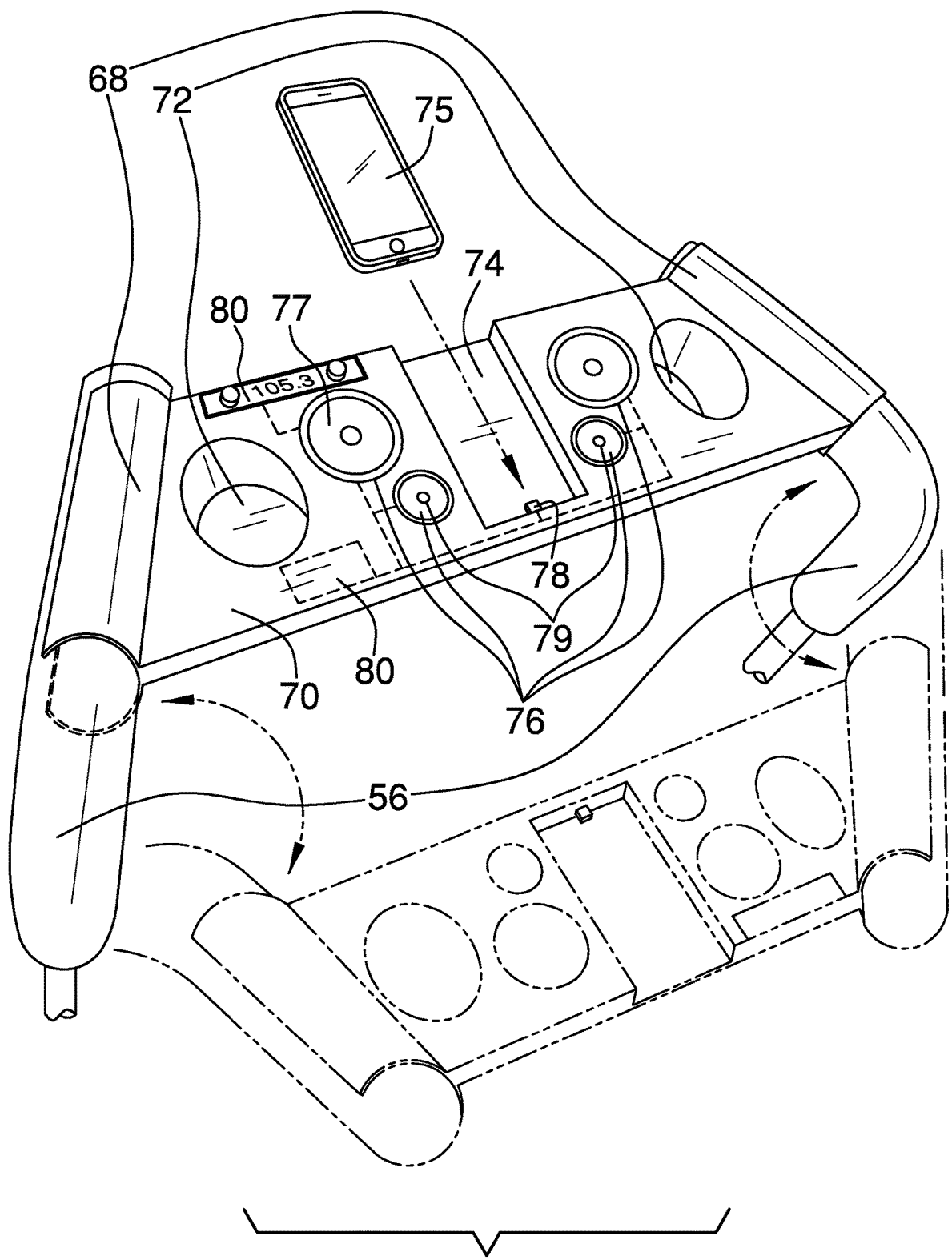
FIG. 4 is a detail view of an embodiment of the disclosure.
Figure 5:
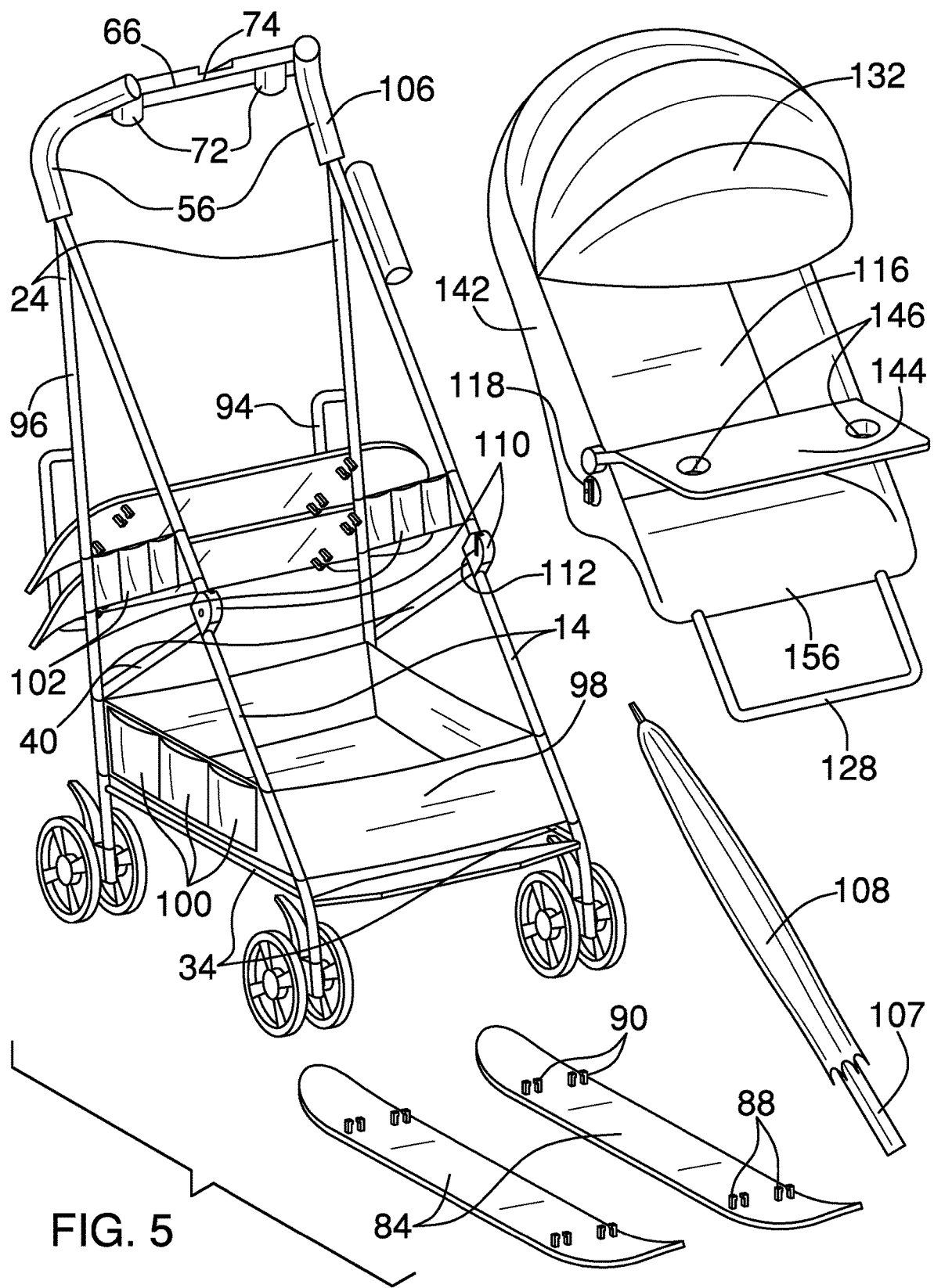
FIG. 5 is an isometric view of an embodiment of the disclosure.
Figure 6:
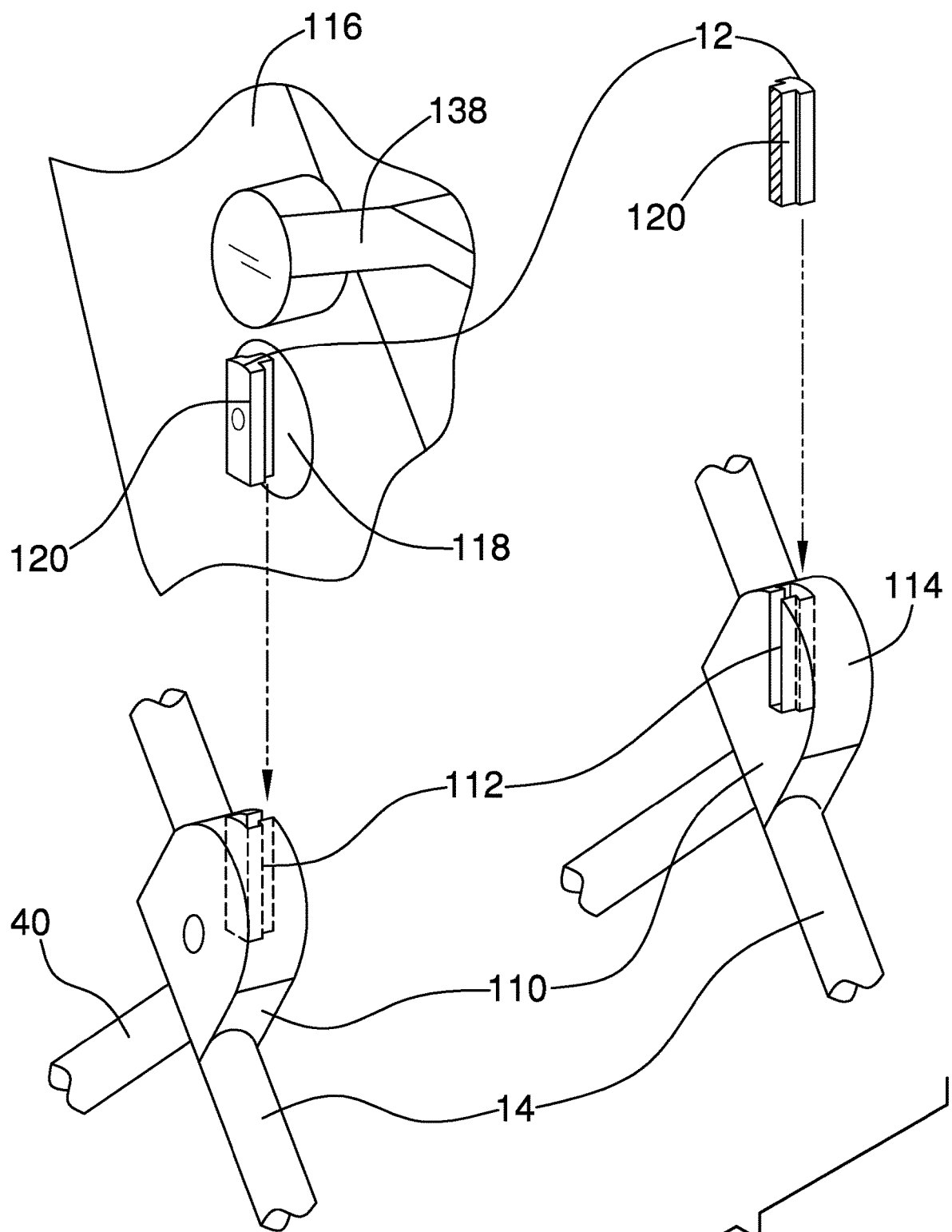
FIG. 6 is a detail view of an embodiment of the disclosure.
Figure 7:
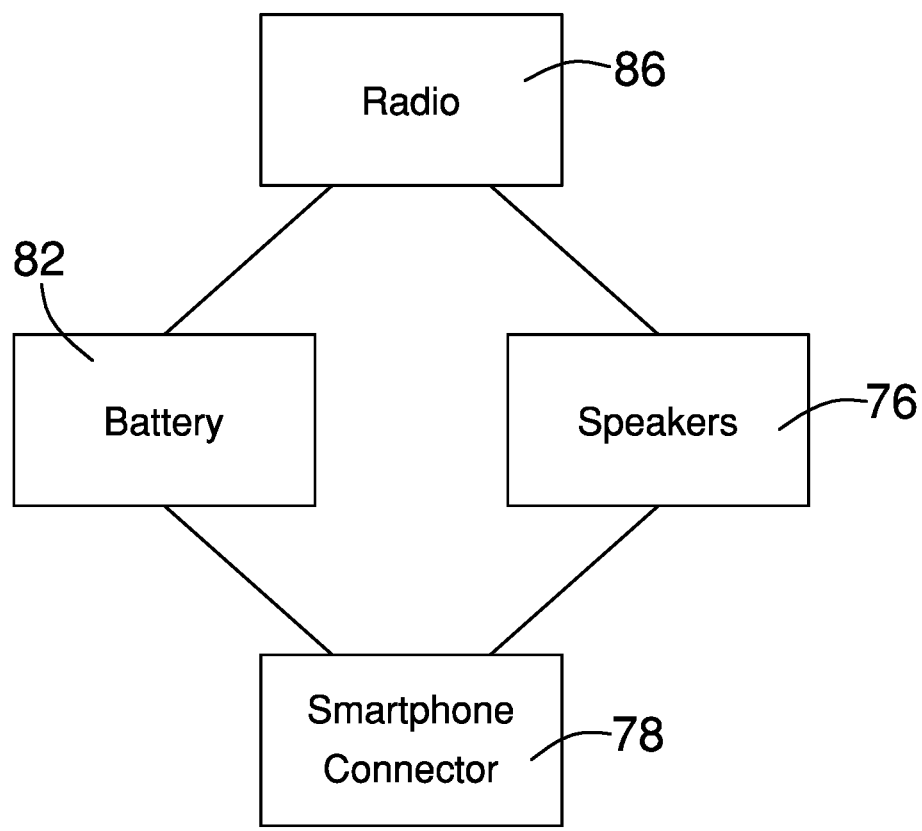
FIG. 7 is a block diagram view of an embodiment of the disclosure.

With reference now to the drawings, and in particular to FIGS. 1 through 7 thereof, a new stroller embodying the principles and concepts of an embodiment of the disclosure and generally designated by the reference numeral 10 will be described.

As best illustrated in FIGS. 1 through 7, the all-terrain accessorized stroller apparatus 10 generally comprises a stroller frame 12 that comprises a pair of angled front supports 14 that comprise a left front support 16 and a right front support 18 that each have a wheel end 20 and a handle end 22. A pair of vertical rear supports 24 is coupled to the pair of front supports 14. The pair of rear supports 24 comprises a left rear support 26 and a right rear support 28 each having a top end 30 and a bottom end 32. The top end 30 of the left rear support 26 and the right rear support 28 is coupled to the left front support 16 and the right front support 18, respectively. A pair of lower cross supports 34 is coupled between the pair of rear supports 24 and the pair of front supports 14. The pair of lower cross supports 34 comprises a left lower cross support 36 and a right lower cross support 38. A pair of medial cross supports 40 is coupled between the pair of rear supports 24 and the pair of front supports 14. The pair of medial cross supports 40 comprises a left medial cross support 42 and a right medial cross support 44.

A set of wheels 46 is coupled to the stroller frame 12. Each wheel 46 of the set of wheels 46 has an inner wheel 50, an outer wheel 52, and a curved brake pedal 54 coupled therebetween. The set of wheels 46 is coupled to the wheel end 20 of the pair of front supports 14 and the bottom end 32 of the pair of rear supports 24. A pair of handles 56 is coupled to the stroller frame 12. Each of the pair of handles 56 has a curved portion 58 coupled to the handle end 22 of the pair of front supports 14 and a straight portion 60 extending from the curved portion 58. The curved portion 58 is rotatingly engageable with the front support 14 such that the pair of handles 56 have a front position 62 and an alternative back position 64. A console 66 has a pair of handle clamps 68 and a console body 70. The console body 70 is trapezoidal and has at least one cup holder depression 72. Each of the handle clamps 68 is semi-cylindrical and selectively engageable with the straight portion 60 in either the front position 62 or the back position 64.

The console body 70 has a smartphone recession 74 configured to selectively receive a smartphone 75. A plurality of speakers 76 is coupled to the console 66 and may comprise a pair of larger speakers 77 and a pair of smaller speakers 79. A smartphone connector 78 is coupled within the smartphone recession 74 of the console 66 and is in operational communication with the speakers 76. A radio 80 is coupled to the console 66 and is in operational communication with the speakers 76. A battery 82 is coupled to the console 66 within the console body 70 and is in operational communication with the speakers 76, the smartphone connector 78, and the radio 80.

Each of a pair of skis 84 has a plurality of wheel clamps 86. The plurality of wheel clamps 86 is selectively engageable with the set of wheels 46. The plurality of wheel clamps 86 of each ski 84 comprises a pair of front clamps 88 for each of the inner wheel 50 and the outer wheel 52 and a pair of rear clamps 90 for the inner wheel 50 and the outer wheel 52. A ski rack 92 is coupled to the stroller frame 12. The ski rack 92 is coupled to the pair of rear supports 24 and selectively receives the pair of skis 84 while not engaged with the set of wheels 46. The ski rack 92 comprises a left rack 94 and a right rack 96 coupled to the left rear support 26 and the right rear support 28, respectively. Each of the left rack 94 and the right rack 96 is a squared C-shape.

A storage basket 98 is coupled between the rear supports 24 and the front supports 14 above the lower cross supports 38 and below the medial cross supports 40. The storage basket 98 may have a plurality of first side pockets 100. A pair of pocket strips 102 is coupled between the rear supports 24 and the front supports 14 above the medial cross supports 40. Each of the pair of pocket strips 102 has a plurality of second side pockets 104. An umbrella holder 106 is coupled to the stroller frame 12 proximal the pair of handles 56 and selectively receives a telescoping shaft 107 of an umbrella 108. A pair of seat supports 110 is coupled to the stroller frame 12. Each of the pair of seat supports 110 is D-shaped and has an engagement channel 112 extending through a curved top face 114. A child seat 116 is coupled to the pair of seat supports 110 and has a pair of connectors 118. An engagement tongue 120 is slidably engageable with the engagement channel 112. The engagement channel 112 and the engagement tongue 120 each has a T-shaped profile which may have a curved top arm 121. The child seat 116 is engageable with the pair of seat supports 110 in a forward position 124 or in an alternative backwards position 126. A foot bar 128 is coupled to a front lip 130 of the child seat 116 and is a squared U-shape. A canopy 132 is coupled to the child seat 116 and has a collapsed position 134 and an alternative covered position 136. A tray 138 comprises a pair of angled tray arms 140 coupled to a seat shell 142. A tray body 144 having at least one baby cup depression 146 configured to secure a baby bottle is coupled to the pair of tray arms 140.

In use, the user attaches the pair of skis 84 to each of the seat of wheels 46 in snowy or icy conditions to slide the apparatus 10. The user may remove the pair of skis 84 by disengaging the plurality of wheel clamps 86 and then stores the pair of skis 84 within the ski rack 92. In sunny conditions the moves the canopy 132 from the collapsed position 134 to the alternatively covered position 136 over the child seat 116 for sun protection. The user may create her own sun protection using by expanding the umbrella 108 held within the umbrella holder 106. The user may also enjoy audio entertainment through the plurality of speakers 76 via the smartphone connector 78 or the radio 80.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An all-terrain accessorized stroller apparatus comprising:
   a stroller frame;
   a set of wheels coupled to the stroller frame;
   a pair of handles coupled to the stroller frame;
   a console coupled to the pair of handles, the console having a pair of handle clamps and a console body, the pair of handle clamps being selectively engageable with the pair of handles, the console body having at least one cup holder depression;
   a pair of skis, each of the pair of skis having a plurality of wheel clamps, the plurality of wheel clamps being selectively engageable with the set of wheels;
   a ski rack coupled to the stroller frame, the ski rack selectively receiving the pair of skis while not engaged with the set of wheels;
   a pair of seat supports coupled to the stroller frame, each of the pair of seat supports having an engagement channel;
   a child seat coupled to the pair of seat supports, the child seat having a pair of connectors each having an engagement tongue, the engagement tongue being slidably engageable with the engagement channel, the child seat being engageable with the pair of seat supports in a forward position or in an alternative backwards position;
   a canopy coupled to the child seat, the canopy having a collapsed position and an alternative covered position; and
   a tray coupled to the child seat.

2. The all-terrain accessorized stroller apparatus of claim 1 further comprising the stroller frame comprising:

a pair of angled front supports, the pair of front supports comprising a left front support and a right front support each having a wheel end and a handle end;

a pair of vertical rear supports coupled to the pair of front supports, the pair of rear supports comprising a left rear support and a right rear support each having a top end and a bottom end, the top end of the left rear support and the right rear support being coupled to the left front support and the right front support, respectively;

a pair of lower cross supports coupled between the pair of rear supports and the pair of front supports, the pair of lower cross supports comprising a left lower cross support and a right lower cross support; and a pair of medial cross supports coupled between the pair of rear supports and the pair of front supports, the pair of medial cross supports comprising a left medial cross support and a right medial cross support;

the ski rack being coupled to the pair of rear supports, the ski rack comprising a left rack and a right rack coupled to the left rear support and the right rear support, respectively.

3. The all-terrain accessorized stroller apparatus of claim 2 further comprising each of the left rack and the right rack being a squared C-shape.

4. The all-terrain accessorized stroller apparatus of claim 2 further comprising a storage basket, the storage basket being coupled between the rear supports and the front supports above the lower cross supports and below the medial cross supports, the storage basket having a plurality of first side pockets.

5. The all-terrain accessorized stroller apparatus of claim 4 further comprising a pair of pocket strips coupled between the rear supports and the front supports above the medial cross supports, each of the pair of pocket strips having a plurality of second side pockets.

6. The all-terrain accessorized stroller apparatus of claim 1 further comprising a foot bar coupled to the child seat, the foot bar being coupled to a front lip of the child seat and being a squared U-shape.

7. The all-terrain accessorized stroller apparatus of claim 1 further comprising an umbrella holder coupled to the stroller frame proximal the pair of handles, the umbrella holder selectively receiving a telescoping shaft of an umbrella.

8. The all-terrain accessorized stroller apparatus of claim 2 further comprising each of the pair of handles having a curved portion coupled to the handle end of the pair of front supports and a straight portion extending from the curved portion, the curved portion being rotatingly engageable with the front support such that the pair of handles have a front position and an alternative back position.

9. The all-terrain accessorized stroller apparatus of claim 8 further comprising the console body being trapezoidal, each of the handle clamps being semi-cylindrical and selectively engageable with the straight portion in either the front position or the back position.

10. The all-terrain accessorized stroller apparatus of claim 1 further comprising the console body having a smartphone recession, a plurality of speakers, a smartphone connector, a radio, and a battery being coupled within the console body, the plurality of speakers, the smartphone connector, the radio, and the battery being in operational communication.

11. The all-terrain accessorized stroller apparatus of claim 1 further comprising the engagement channel and the engagement tongue having a T-shaped profile.

12. The all-terrain accessorized stroller apparatus of claim 1 further comprising each of the pair of seat supports being D-shaped, the engagement channel extending through a curved top face of each of the seat supports.

13. The all-terrain accessorized stroller apparatus of claim 1 further comprising each wheel of the set of wheels having an inner wheel, an outer wheel, and a curved brake pedal coupled therebetween.

14. The all-terrain accessorized stroller apparatus of claim 13 further comprising the plurality of wheel clamps of each ski comprising a pair of front clamps for each of the inner wheel and the outer wheel and a pair of rear clamps for the inner wheel and the outer wheel.

15. The all-terrain accessorized stroller apparatus of claim 1 further comprising the tray having a pair of angled tray arms coupled to a seat shell and a tray body coupled to the pair of tray arms, the tray body having at least one baby cup depression configured to secure a baby bottle.

16. An all-terrain accessorized stroller apparatus comprising:

a stroller frame, the stroller frame comprising:

a pair of angled front supports, the pair of front supports comprising a left front support and a right front support each having a wheel end and a handle end;

a pair of vertical rear supports coupled to the pair of front supports, the pair of rear supports comprising a left rear support and a right rear support each having a top end and a bottom end, the top end of the left rear support and the right rear support being coupled to the left front support and the right front support, respectively;

a pair of lower cross supports coupled between the pair of rear supports and the pair of front supports, the pair of lower cross supports comprising a left lower cross support and a right lower cross support; and a pair of medial cross supports coupled between the pair of rear supports and the pair of front supports, the pair of medial cross supports comprising a left medial cross support and a right medial cross support;

a set of wheels coupled to the stroller frame, each wheel of the set of wheels having an inner wheel, an outer wheel, and a curved brake pedal coupled therebetween, the set of wheels being coupled to the wheel end of the pair of front supports and the bottom end of the pair of rear supports;

a pair of handles coupled to the stroller frame, each of the pair of handles having a curved portion coupled to the handle end of the pair of front supports and a straight portion extending from the curved portion, the curved portion being rotatingly engageable with the front support such that the pair of handles have a front position and an alternative back position;

a console coupled to the pair of handles, the console having a pair of handle clamps and a console body, the console body being trapezoidal and having at least one cup holder depression, each of the handle clamps being semi-cylindrical and selectively engageable with the straight portion in either the front position or the back position, the console body having a smartphone recession;

a plurality of speakers coupled to the console;

a smartphone connector coupled to the console, the smartphone connector being coupled within the smartphone recession and in operational communication with the speakers;

a radio coupled to the console, the radio being in operational communication with the speakers;

a battery coupled to the console, the battery being coupled within the console body and in operational communication with the speakers, the smartphone connector, and the radio;

a pair of skis, each of the pair of skis having a plurality of wheel clamps, the plurality of wheel clamps being selectively engageable with the set of wheels, the plurality of wheel clamps of each ski comprising a pair of front clamps for each of the inner wheel and the outer wheel and a pair of rear clamps for the inner wheel and the outer wheel;

a ski rack coupled to the stroller frame, the ski rack being coupled to the pair of rear supports and selectively receiving the pair of skis while not engaged with the set of wheels, the ski rack comprising a left rack and a right rack coupled to the left rear support and the right rear support, respectively, each of the left rack and the right rack being a squared C-shape;

a storage basket, the storage basket being coupled between the rear supports and the front supports above the lower cross supports and below the medial cross supports, the storage basket having a plurality of first side pockets;

a pair of pocket strips coupled between the rear supports and the front supports above the medial cross supports, each of the pair of pocket strips having a plurality of second side pockets;

an umbrella holder coupled to the stroller frame proximal the pair of handles, the umbrella holder selectively receiving a telescoping shaft of an umbrella;

a pair of seat supports coupled to the stroller frame, each of the pair of seat supports being D-shaped and having an engagement channel extending through a curved top face;

a child seat coupled to the pair of seat supports, the child seat having a pair of connectors, the engagement tongue being slidably engageable with the engagement channel, the engagement channel and the engagement tongue each having a T-shaped profile, the child seat being engageable with the pair of seat supports in a forward position or in an alternative backwards position;

a foot bar coupled to the child seat, the foot bar being coupled to a front lip of the child seat and being a squared U-shape;

a canopy coupled to the child seat, the canopy having a collapsed position and an alternative covered position; and a tray coupled to the child seat, the tray having a pair of angled tray arms coupled to a seat shell and a tray body coupled to the pair of tray arms, the tray body having at least one baby cup depression configured to secure a baby bottle.

* * * * *